United States Patent
Korpi (10) Patent No.: US 12,232,102 B2
(45) Date of Patent: Feb. 18, 2025

(54) METHOD AND APPARATUS FOR SELECTING PLURALITY OF TERMINAL DEVICES FOR UPLINK AND DOWNLINK TRANSMISSIONS

(71) Applicant: Nokia Solutions and Networks Oy, Espoo (FI)

(72) Inventor: Dani Johannes Korpi, Helsinki (FI)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 338 days.

(21) Appl. No.: 17/787,984

(22) PCT Filed: Dec. 17, 2020

(86) PCT No.: PCT/EP2020/086892
§ 371 (c)(1),
(2) Date: Jun. 22, 2022

(87) PCT Pub. No.: WO2021/136681
PCT Pub. Date: Jul. 8, 2021

(65) Prior Publication Data
US 2023/0063040 A1 Mar. 2, 2023

(30) Foreign Application Priority Data
Jan. 2, 2020 (FI) ........................ 20205005

(51) Int. Cl.
*G06N 3/084* (2023.01)
*G06N 3/092* (2023.01)
(Continued)

(52) U.S. Cl.
CPC .......... *H04W 72/121* (2013.01); *G06N 3/084* (2013.01); *G06N 3/092* (2023.01);
(Continued)

(58) Field of Classification Search
CPC ..... G06N 3/002–126; G06N 20/00–20; H04B 1/38–588; H04B 17/0082–3913;
(Continued)

(56) References Cited

U.S. PATENT DOCUMENTS

| | | | |
|---|---|---|---|
| 2009/0092066 A1* | 4/2009 | Chindapol | H04W 72/30 |
| 2015/0139347 A1 | 5/2015 | Murch et al. | 7/456 |
| 2018/0375613 A1 | 12/2018 | Byun et al. | 1/61 |

FOREIGN PATENT DOCUMENTS

CN 108632861 A * 10/2018 ............ H04W 24/02

OTHER PUBLICATIONS

Zhang, Qi et al., "User Pairing and Channel Allocation for Full-Duplex Self-Organizing Small Cell Networks", 2017 9th International Conference on Wireless Communications and Signal Processing, IEEE, Oct. 11, 2017, pp. 1-6 (Year: 2017).*
(Continued)

*Primary Examiner* — Timothy J Weidner
(74) *Attorney, Agent, or Firm* — McCarter & English LLP (57) ABSTRACT

An apparatus and method for selecting a plurality of terminal devices for uplink and downlink transmissions are described. A first terminal device is selected from a first group of terminal devices. A reinforcement learning agent is used for selecting the first terminal device based at least on data rates of the terminal devices of the first group and data rates of the terminal devices of a second group. The selected first terminal device is transferred from the first group of terminal devices to the second group of terminal devices. One group of terminal devices is scheduled for downlink transmission and the other group of terminal devices is scheduled for uplink transmission.

15 Claims, 8 Drawing Sheets

(51) Int. Cl.
| | |
|---|---|
| *H04B 1/525* | (2015.01) |
| *H04B 17/391* | (2015.01) |
| *H04W 16/22* | (2009.01) |
| *H04W 24/02* | (2009.01) |
| *H04W 28/02* | (2009.01) |
| *H04W 72/121* | (2023.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |
| *H04W 92/18* | (2009.01) |

(52) U.S. Cl.
CPC ......... *H04B 1/525* (2013.01); *H04B 17/3913* (2015.01); *H04W 16/22* (2013.01); *H04W 24/02* (2013.01); *H04W 28/0231* (2013.01); *H04W 84/02* (2013.01); *H04W 88/02* (2013.01); *H04W 88/08* (2013.01); *H04W 92/02* (2013.01); *H04W 92/10* (2013.01); *H04W 92/18* (2013.01)

(58) Field of Classification Search
CPC . H04J 11/0023–0093; H04J 2011/0003–0096; H04L 5/0001–26; H04W 16/02–32; H04W 24/02–10; H04W 28/02–26; H04W 36/0005–385; H04W 72/02–569; H04W 84/02–16; H04W 88/02–12; H04W 92/02–24
See application file for complete search history.

(56) References Cited

OTHER PUBLICATIONS

Zhang, Qi et al., "User Pairing and Channel Allocation for Full-Duplex Self-Organizing Small Cell Networks", 2017 9th International Conference on Wireless Communications and Signal Processing, IEEE, Oct. 11, 2017, pp. 1-6.

* cited by examiner

METHOD AND APPARATUS FOR SELECTING PLURALITY OF TERMINAL DEVICES FOR UPLINK AND DOWNLINK TRANSMISSIONS

CROSS REFERENCE TO RELATED APPLICATION

This patent application is a U.S. National Stage application of International Patent Application Number PCT/EP2020/086892 filed Dec. 17, 2020, which is hereby incorporated by reference in its entirety, and claims priority to FI 20205005 filed Jan. 2, 2020.

TECHNICAL FIELD

Various example embodiments relate to a method and an apparatus for selecting a plurality of terminal devices for uplink and downlink transmissions.

BACKGROUND

In-Band full-duplex (IBFD) communication is an advancement in wireless communication which facilitates simultaneous transmission and reception, in the same frequency, between a base station and terminal devices. When an individual bidirectional link is considered, IBFD can double the spectral efficiency since the same time-frequency resource can be used to transfer data in both directions. However, such IBFD operation suffers from the self-interference (SI) caused by the full-duplex operation. Various prototype implementations are available where the self-interference (SI) has been successfully cancelled.

A potential use-case of IBFD is to have an IBFD-capable base station serve half-duplex terminal devices, such that the uplink and downlink transmissions overlap in time and in frequency. In principle, this can as much as double the spectral efficiency since uplink and downlink transmissions can share the same time-frequency resource. However, while the base station can manage the self-interference (SI), this approach suffers from inter-user-interference between the terminal devices, since the transmit signal of one terminal device will interfere with the reception signal of another terminal device, as the terminal devices are operating on the same time-frequency resource. Furthermore, measurements defined in the 3rd Generation Partnership Project (3GPP) do not disclose information regarding mutual interference levels between the terminal devices. Moreover, requesting such information in the form of new measurements and signaling, results in producing considerable overhead that would diminish some of the gain in spectral efficiency.

Currently, one or more methodologies are employed to overcome the above-mentioned drawbacks. The one or more methodologies include a map based approach and an interference alignment procedure. However, the map based approach requires real-time knowledge of the terminal device's position along with up-to-date information regarding obstacles in the environment. On the other hand, the interference alignment procedure typically assumes multi-antenna terminal devices which sacrifice some of their degrees-of-freedom to null the inter-user-interference. That is, such interference alignment procedures require additional resources from the terminal devices to facilitate the simultaneous uplink and downlink transmission, and consequently sacrifice some of their capacity.

Further, interference alignment can be performed without multiple antennas at the terminal devices. However, it requires extensive knowledge of different channels, and/or reconfigurable antennas at the base station. Consequently, a considerable amount of capacity is used for channel estimation and signaling of that information, in addition to having to invest in extra hardware at the base station side to facilitate the interference alignment. Therefore, there is a need for an improved method and apparatus to overcome the inter-user-interference with minimal overhead, in order to maximize the capacity gain of IBFD systems.

SUMMARY

In accordance with an example embodiment, an apparatus for selecting a plurality of terminal devices for uplink and downlink transmissions is disclosed. The apparatus comprises means for selecting a first terminal device from a first group of terminal devices, and means for transferring the selected first terminal device from the first group of terminal devices to a second group of terminal devices, wherein one group of terminal devices is scheduled for uplink transmission and the other group of terminal devices is scheduled for downlink transmission. Further, the means for selecting the first terminal device comprises a reinforcement learning (RL) agent for selecting the first terminal device based at least on data rates of the terminal devices of the first group and data rates of the terminal devices of the second group.

The apparatus further comprises means for determining the data rates of terminal devices of the first group and the data rates of the terminal devices of the second group during a first transmission time interval (TTI), when the terminal devices of the first group are in downlink (DL) mode and the terminal devices of the second group are in uplink (UL) mode, and during a second transmission time interval (TTI) when the terminal devices of the first group are in uplink (UL) mode and the terminal devices of the second group are in downlink (DL) mode. Preferably, the first transmission time interval (TTI) and the second transmission time interval (TTI) are two consecutive transmission time intervals.

The apparatus further comprises means for selecting a second terminal device from the second group of terminal devices based on data rates of the terminal devices of the second group, determined during the TTI when the first terminal device was in the group scheduled for the uplink transmission; and means for transferring the selected second terminal device from the second group of terminal devices to the first group of terminal devices, to obtain an updated first group of terminal devices and an updated second group of terminal devices. This aspect can be seen as a second phase of the selection process for selecting a plurality of terminal devices for uplink and downlink transmissions. After a first stage (Reinforcement Learning phase), in which a first terminal device is selected to be changed from the first group to the second group, according to one of the example embodiments described above, this second phase is preferably implemented as a heuristic step for selecting a second terminal device from the second group to replace the selected first terminal device within the first group. Preferably, a heuristic function selects the second terminal device from the second group of terminal devices based at least on data rates of the terminal devices of the second group, determined during the TTI when the first terminal device was in the group scheduled for the uplink transmission. Preferably, the second terminal device is selected from the second group of terminal devices as the terminal device with a determined lowest data rate. Such transfer of the selected second terminal device from the second group to the first group, results in maintaining sizes of the first group and the second group.

It should be noted that transferring the second terminal device restores balance in the number of terminal devices in the first group and second group of terminal devices, which was disrupted earlier due to transfer of the first terminal device from the first group of terminal devices to the second group of terminal devices. Such usage of the heuristic function reduces output space of the RL agent and burden on the RL agent for selecting the second terminal device and thus results in faster learning of the RL agent.

The apparatus further comprises means for determining data rates of terminal devices of the updated first group and updated second group.

The apparatus further comprises means for determining a reward for the RL agent, based at least on summation of determined data rates of the terminal devices of the updated first group and the updated second group reduced by the determined lowest data rate, to penalize for unfairness, with proper scaling.

The apparatus further comprises means for training the RL agent based at least on the determined data rates of the terminal devices of the updated first group and the updated second group and the determined reward. Based on the training of the RL agent, the RL agent learns to detect the interference structure based at least on the data rates of the terminal devices. Further, the training of the RL agent assists in selection of a terminal device for minimizing the interference between two groups of terminal devices, operating on the same frequency. It should be noted that the RL agent is trained until a predefined number of iterations have been carried out or the target data rates have been achieved. Preferably, the data rates of the terminal devices of the first group and the second group, and the data rates of the terminal devices of the updated first group and the updated second group are normalized between 0 and 1.

The apparatus further comprises means for terminating the selection of the first terminal device and the selection of the second terminal device based at least on completing a predefined number of phases for the selection of the terminal device, attaining a predetermined sum rate, attaining a predetermined minimum downlink data rate, or the first group and the second group have not changed during a predefined number of phases.

In accordance with another example embodiment, a method for selecting a plurality of terminal devices for uplink and downlink transmissions is disclosed. The method comprises selecting a first terminal device from a first group of terminal devices, and transferring the selected first terminal device from the first group of terminal devices to a second group of terminal devices, wherein one group of terminal devices is scheduled for uplink transmission and the other group of terminal devices is scheduled for downlink transmission. Further, the first terminal device is selected from the first group of terminal devices using a reinforcement learning (RL) agent based at least on data rates of the terminal devices of the first group and data rates of the terminal devices of the second group. This provides the advantage of dividing the terminal devices for uplink and downlink transmissions in such a way that the mutual interference between the two groups is small.

The method further comprises determining the data rates of the terminal devices of the first group and the data rates of the terminal devices of the second group during a first transmission time interval (TTI), when the terminal devices of the first group are in downlink (DL) mode and the terminal devices of the second group are in uplink (UL) mode, and during a second transmission time interval (TTI) when the terminal devices of the first group are in uplink (UL) mode and the terminal devices of the second group are in downlink (DL) mode. Preferably, the first transmission time interval (TTI) and the second transmission time interval (TTI) are two consecutive transmission time intervals.

The method further comprises selecting a second terminal device from the second group of terminal devices based on data rates of the terminal devices of the second group, determined during the TTI when the first terminal device was in the group scheduled for the uplink transmission; and transferring the selected second terminal device from the second group of terminal devices to the first group of terminal devices, to obtain an updated first group of terminal devices and an updated second group of terminal devices. This aspect can be seen as a second phase of the selection process for selecting a plurality of terminal devices for uplink and downlink transmissions. After a first stage (Reinforcement Learning phase), in which a first terminal device is selected to be changed from the first group to the second group, according to one of the example embodiments described above, this second phase is preferably implemented as a heuristic step for selecting a second terminal device from the second group to replace the selected first terminal device within the first group. Preferably, a heuristic function selects the second terminal device from the second group of terminal devices based at least on data rates of the terminal devices of the second group, determined during the TTI when the first terminal device was in the group scheduled for the uplink transmission. Preferably, the second terminal device is selected from the second group of terminal devices as the terminal device with a determined lowest data rate. Such transfer of the selected second terminal device from the second group to the first group, results in maintaining sizes of the first group and the second group.

It should be noted that transferring the second terminal device restores balance in the number of terminal devices in the first group and second group of terminal devices, which was disrupted earlier due to transfer of the first terminal device from the first group of terminal devices to the second group of terminal devices. Such usage of the heuristic function reduces output space of the RL agent and burden on the RL agent for selecting the second terminal device and thus results in faster learning of RL agent.

Further, the method comprises determining data rates of terminal devices of the updated first group and the updated second group.

The method further comprises determining a reward for the RL agent based at least on summation of the determined data rates of the terminal devices of the updated first group and the updated second group reduced by the determined lowest data rate, to penalize for unfairness, with proper scaling.

The method further comprises training the RL agent based at least on the determined data rates of the terminal devices of the updated first group and the updated second group and the determined reward. Based on the training of the RL agent, the RL agent learns to detect the interference structure based at least on data rates of the terminal devices. Further, the training of the RL agent assists in selection of a terminal device for minimizing the interference between two groups of terminal devices, operating on the same frequency. It should be noted that the RL agent is trained until a predefined number of iterations have been carried out or the target data rates have been achieved. Preferably, the data rates of the terminal devices of the first group and the second group, and the data rates of the terminal devices of the updated first group and the updated second group are normalized between 0 and 1.

The method further comprises terminating the selection of the first terminal device and the selection of the second terminal device based at least on completing a predefined number of phases for the selection of the terminal device, attaining a predetermined sum rate, attaining a predetermined minimum downlink data rate, or the first group and the second group have not changed during a predefined number of phases.

In accordance with yet another example embodiment, a non-transitory computer-readable medium is disclosed. The non-transitory computer-readable medium comprises instructions for causing a processor to perform functions, including selecting a first terminal device from a first group of terminal devices, and transferring the selected first terminal device from the first group of terminal devices to a second group of terminal devices, wherein one group of terminal devices is scheduled for uplink transmission and the other group of terminal devices is scheduled for downlink transmission, wherein one group of terminal devices is scheduled for uplink transmission and the other group of terminal devices is scheduled for downlink transmission. Further, the first terminal device is selected from a first group of terminal devices using a reinforcement learning (RL) agent based at least on data rates of the terminal devices of the first group and data rates of the terminal devices of a second group. This provides the advantage of dividing the terminal devices for uplink and downlink transmissions in such a way that the mutual interference between the two groups is small.

Further, the non-transitory computer-readable medium includes instructions for causing the processor to perform functions including determining the data rates of the terminal devices of the first group and the data rates of the terminal devices of the second group during a first transmission time interval (TTI), when the terminal devices of the first group are in downlink (DL) mode and the terminal devices of the second group are in uplink (UL) mode, and during a second transmission time interval (TTI) when the terminal devices of the first group are in uplink (UL) mode and the terminal devices of the second group are in downlink (DL) mode. Preferably, the first transmission time interval (TTI) and the second transmission time interval (TTI) are two consecutive transmission time intervals.

Further, the non-transitory computer-readable medium includes instructions for causing a processor to perform functions including selecting a second terminal device from the second group of terminal devices based on data rates of the terminal devices of the second group, determined during the TTI when the first terminal device was in the group scheduled for the uplink transmission; and transferring the selected second terminal device from the second group of terminal devices to the first group of terminal devices, to obtain an updated first group of terminal devices and an updated second group of terminal devices. This aspect can be seen as a second phase of the selection process for selecting a plurality of terminal devices for uplink and downlink transmissions. After a first stage (Reinforcement Learning phase), in which a first terminal device is selected to be changed from the first group to the second group, according to one of the example embodiments described above, this second phase is preferably implemented as a heuristic step for selecting a second terminal device from the second group to replace the selected first terminal device within the first group. Preferably, a heuristic function selects the second terminal device from the second group of terminal devices based at least on data rates of the terminal devices of the second group, determined during the TTI when the first terminal device was in the group scheduled for the uplink transmission. Preferably, the second terminal device is selected from the second group of terminal devices as the terminal device with a determined lowest data rate. Such transfer of the selected second terminal device from the second group to the first group, results in maintaining sizes of the first group and the second group.

It should be noted that transferring the second terminal device restores balance in the number of terminal devices in the first group and second group of terminal devices, which was disrupted earlier due to transfer of the first terminal device from the first group of terminal devices to the second group of terminal devices. Such usage of the heuristic function reduces output space of the RL agent and burden on the RL agent for selecting the second terminal device and thus results in faster learning of the RL agent.

Further, the non-transitory computer-readable medium includes instructions for causing the processor to perform functions including determining data rates of terminal devices of the updated first and the updated second group.

Further, the non-transitory computer-readable medium includes instructions for causing the processor to perform functions including determining a reward for the RL agent, based at least on summation of determined data rates of the terminal devices of the updated first group and the updated second group reduced by the determined lowest data rate, penalize for unfairness, with proper scaling.

Further, the non-transitory computer-readable medium includes instructions for causing the processor to perform functions including training the RL agent based at least on the determined data rates of the terminal devices of the updated first group and the updated second group and the determined reward. Based on the training of the RL agent, the RL agent learns to detect the interference structure based at least on data rates of the terminal devices. Further, the training of the RL agent assists in selection of a terminal device for minimizing the interference between two groups of terminal devices, operating on the same frequency. It should be noted that the RL agent is trained until a predefined number of iterations have been carried out or the target data rates have been achieved. Preferably, the data rates of the terminal devices of the first group and the second group, and the data rates of the terminal devices of the updated first group and the updated second group are normalized between 0 and 1.

Further, the non-transitory computer-readable medium includes instructions for causing the processor to perform functions including terminating the selection of the first terminal device and the selection of the second terminal device based at least on completing a predefined number of phases for the selection of the terminal device, attaining a predetermined sum rate, attaining a predetermined minimum downlink data rate, or the first group and the second group have not changed during a predefined number of phases.

Altogether, the apparatus and algorithm according to the exemplary embodiments described herewith allow to identify the most suitable terminal devices for simultaneous UL (uplink) and DL (downlink) operation in an efficient manner, without requiring any extra measurements or signaling. Further, it facilitates determination of suitable data sources for a fast and efficient training of the RL agent. Since the RL agent receives the data rates of each terminal device in both UL and DL modes (that is, the two groups take turns in being in UL and in DL), the RL can efficiently learn a general rule.

In addition, by introducing a heuristic function, the output space of the RL algorithm is reduced, reducing further the time for selecting the terminal devices. The heuristic function determines which terminal device should be switched to the other group to replace the terminal device picked by the RL agent and thereby maintain a balance between the two groups. Without the heuristic function, the RL agent should make both decisions, which would result in an extremely large output space and slower learning.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include such aspects and their equivalents.

BRIEF DESCRIPTION OF THE DRAWINGS

Further embodiments, details, advantages, and modifications of the present example embodiments will become apparent from the following detailed description of the embodiments, which is to be taken in conjunction with the accompanying drawings, wherein.

DETAILED DESCRIPTION

Some embodiments of this disclosure, illustrating its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to the listed item or items.

It should also be noted that as used herein and in the appended claims, the singular forms "a," "an," and "the" include plural references unless the context clearly dictates otherwise. Although any apparatus and method similar or equivalent to those described herein can be used in the practice or testing of embodiments of the present disclosure, the apparatus and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

An example embodiment of the present disclosure and its potential advantages are understood by referring to FIGS. 1 through 5 of the drawings, like numerals being used for like and corresponding parts of the various drawings.

Figure 1A:
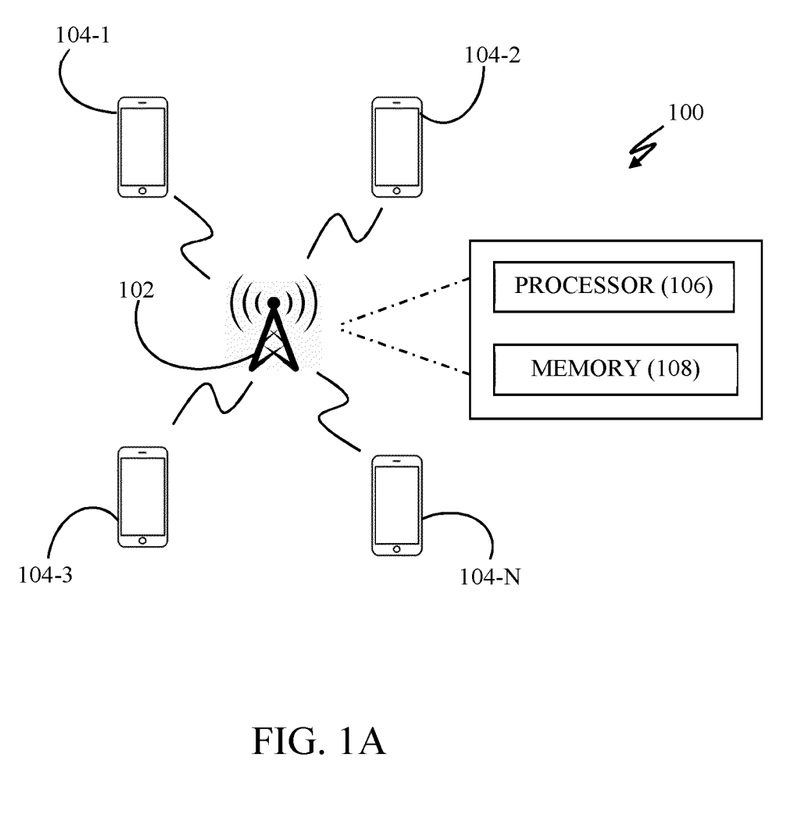
FIG. 1A illustrates a network cell diagram showing an apparatus for selecting a plurality of terminal devices for uplink and downlink transmissions, according to an example embodiment of the subject matter described herein.

FIG. 1A illustrates a network cell diagram 100 showing an apparatus 102 for selecting a plurality of terminal devices 104-1 to 104-N for uplink and downlink transmissions, according to an example embodiment. Hereinafter, the apparatus 102 may be referred to as a base station (BS) 102 and the plurality of terminal devices 104-1-104-N may be referred to as terminal devices 104.

The network cell diagram 100 comprises a IBFD-capable base station 102 connected to the terminal devices (or User Equipment, UEs) 104 via a communication network (not shown). The communication network may be implemented using at least one communication technique selected from and not limiting to Visible Light Communication (VLC), Worldwide Interoperability for Microwave Access (WiMAX), Long term evolution (LTE), Wireless local area network (WLAN), Infrared (IR) communication, Public Switched Telephone Network (PSTN), Radio waves, and any other wired and/or wireless communication techniques.

The base station 102 may be, but is not limited to, Wireless Fidelity (Wi-Fi) access point, eNodeB (eNB), or radio station. Further, the base station 102 may comprise a processor 106 and a memory 108. The processor 106 includes suitable logic, circuitry, and/or interfaces that are operable to execute instructions stored in the memory 108 to perform various functions. The processor 106 may execute an algorithm stored in the memory 108 for selecting the terminal devices 104 for uplink and downlink transmissions. The processor 106 may also be configured to decode and execute any instructions received from one or more other electronic devices or server(s). The processor 106 may include one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor). The processor 106 may be further configured to execute one or more computer-readable program instructions, such as program instructions to carry out any of the functions described in the description.

The memory 108 stores a set of instructions and data. Further, the memory 108 includes the one or more instructions that are executable by the processor 106 to perform specific operations. Some of the commonly known memory implementations include, but are not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

The terminal devices 104 may be at least one of a user equipment (UE) used directly by an end user to communicate. In one example embodiment, the terminal devices 104 are equipped with legacy half-duplex radio capabilities. In yet another example embodiment, the terminal devices 104 corresponds to a smartphone, as shown in FIG. 1A. The terminal devices 104 may be, but are not limited to, a computer, a telephone, a desktop, a personal digital assistant (PDA), or a laptop. Further, the terminal devices 104 may comprise input or output interfaces like a display screen, a touch screen, an antenna, and/or a microphone. In one example embodiment, the touch screen may correspond to at least one of a resistive touch screen, capacitive touch screen, or a thermal touch screen. It will be apparent to one skilled in the art that above-mentioned components of the base station 102 have been provided for illustration purpose, without departing from the scope of the disclosure.

Figure 1B:
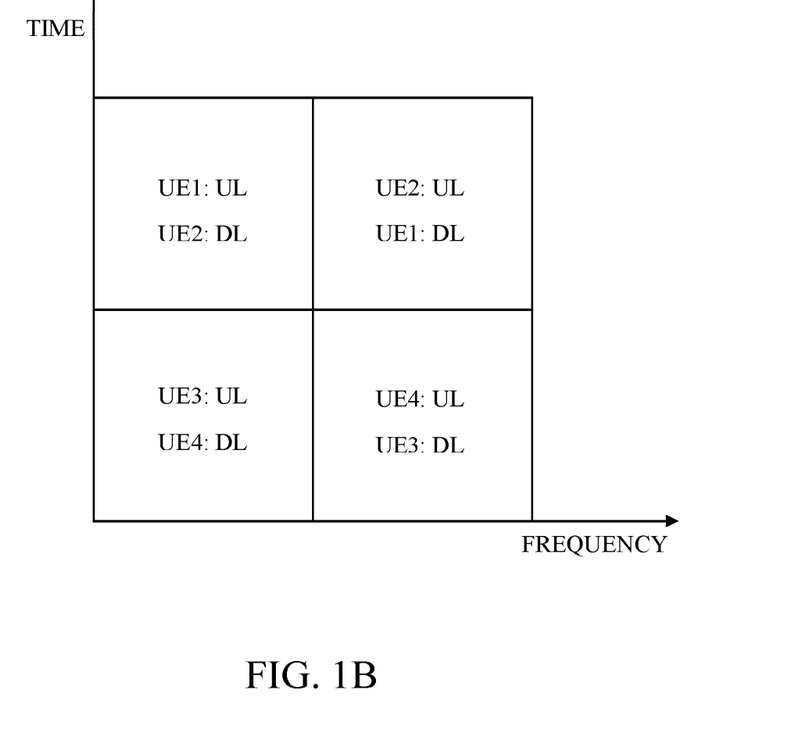
FIG. 1B illustrates time and frequency resource allocation when an In-Band full-duplex (IBFD)-capable base station is serving half-duplex terminal devices, according to an example embodiment of the subject matter described herein.

The type of a network cell diagram illustrated in FIG. 1A is inherently asymmetric since the base station 102 is using the same time-frequency resource for transmitting downlink (DL) data to UE1 and receiving uplink (UL) data from a different UE2, as illustrated in FIG. 1B for the time-frequency resource allocation. Even though the base station 102 may manage the ensuing self-interference (SI), there may also be inter-user-interference between the UEs since the transmit signal of UE2 may interfere with the reception of UE1 as they are operating on the same time-frequency resource. It should be noted that the magnitude of the interference will depend on the path loss between the two UEs, but it will always be non-zero.

Figure 2A:
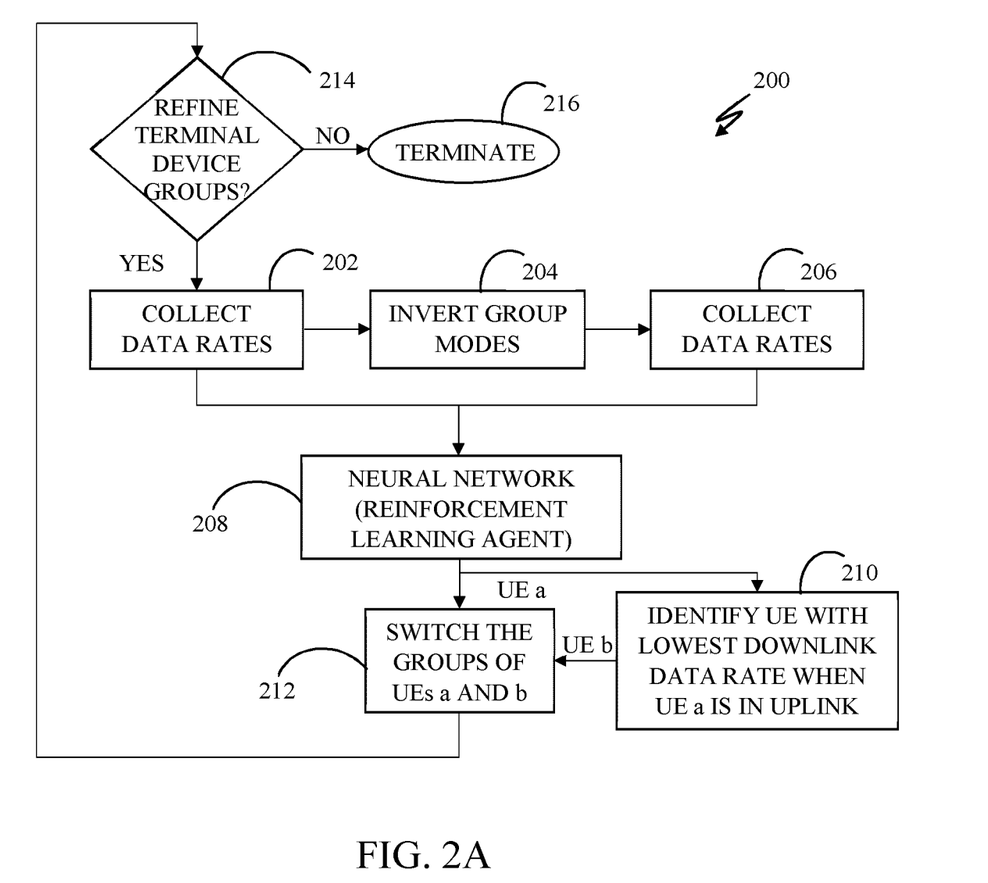
FIG. 2A illustrates a flowchart showing a high-level operation of a method for selecting a plurality of terminal devices for uplink and downlink transmissions, according to an example embodiment of the subject matter described herein.

FIG. 2A illustrates a flowchart 200 showing a high-level operation of a method for selecting the terminal devices 104 for uplink and downlink transmissions, according to an example embodiment. FIG. 2A is described in conjunction with FIGS. 2B and 2C. Preferred steps of the method for selecting the terminal devices 104 according to further embodiments are illustrated in FIGS. 3A and 3B.

At first, based on signal quality of each terminal device 104, the terminal devices 104 may be divided iteratively into two groups. The two groups may correspond to a first group 226A and a second group 226B, as shown in FIG. 2C. The first group 226A may comprise terminal devices $104A_1$, $104A_2$, ... $104A_N$. Hereinafter, the terminal devices $104A_1$, $104A_2$, ... $104A_N$ of the first group 226A may be referred to as 104A. Similarly, the second group 226B may comprise terminal devices $104B_1$, $104B_2$, ... $104B_N$. Hereinafter, the terminal devices $104B_1$, $104B_2$, ... $104B_N$ of the second group 226B may be referred to as 104B. The final terminal device groups 226A and 226B are such that the mutual interference between them is as small as possible, meaning that while one group may be in downlink (DL) mode, the other group may be in uplink (UL) mode on the same time-frequency resource. In this way, terminal device pairs with low mutual interference, suitable for simultaneous UL and DL operation, may be determined without any overhead from extra measurements or signaling.

Successively, data rates of the terminal devices 104 for a first transmission time interval (TTI) when the terminal devices 104A of the first group 226A are in DL mode and the terminal devices 104B of the second group 226B are in UL mode, are collected, at step 202. Successively, the modes of the terminal devices 104A of the first group 226A and the second group 226B are inverted, at step 204. The modes of the terminal devices 104A of the first group 226A are changed from the DL mode to UL mode. Similarly, the modes of the terminal devices 104B of the second group 226B are changed from the UL mode to DL mode. Successively, the data rates of the terminal devices 104 are collected again, at step 206. Successively, the data rates are stacked into a state vector and fed to a neural network i.e. a pretrained neural network, at step 208. In one example embodiment, the neural network may be referred to as a reinforcement leaning (RL) agent 218. The first group 226A may be the one from which the first terminal device UEa is selected by the RL agent 218. The first terminal device UEa may be selected from the first group 226A of terminal devices 104A using the RL agent 218 based at least on data rates of the terminal devices 104A of the first group 226A and data rates of terminal devices 104B of the second group 226B.

Successively, as indicated by the neural network, the first terminal device UEa is moved to the second group 226B, at step 212. For instance, if the selected terminal device UEa was in the group that was in DL mode during the first TTI, move it to the other group that was in UL mode. Successively, in order to maintain the sizes of the groups, a second terminal device UEb is identified from the second group 226B of terminal devices 104B, having poorest downlink data rate when the first terminal device UEa selected by the neural network was in UL mode, at step 210. Further, the selected second terminal device is transferred from the second group 226B to the first group 226A, that is missing one terminal device, at step 212. Thereafter, the groups 226A and 226B are refined until a predefined number of iterations have been carried out or the target data rates have been achieved, at steps 214 and 216.

Figure 2B:
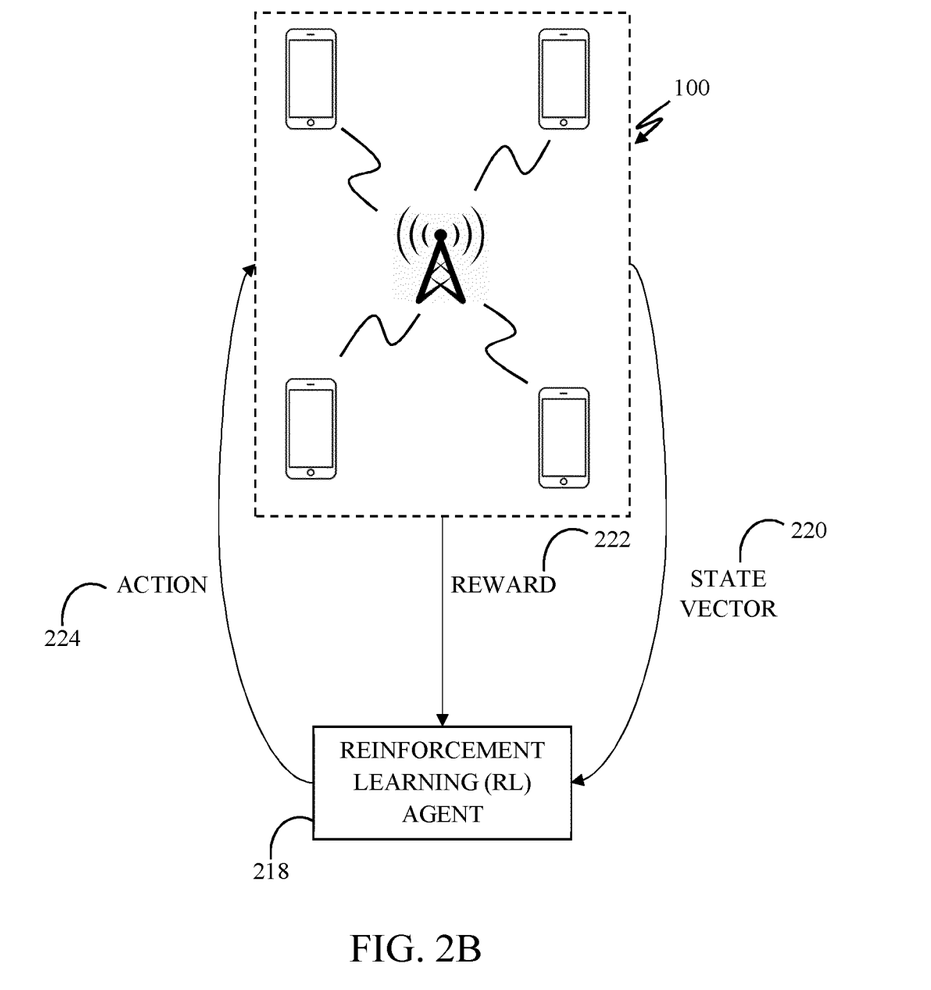
FIG. 2B illustrates the network cell diagram showing the apparatus for selecting the plurality of terminal devices for uplink and downlink transmissions, using a reinforcement learning (RL) agent, according to another example embodiment of the subject matter described herein.
Figure 2C:
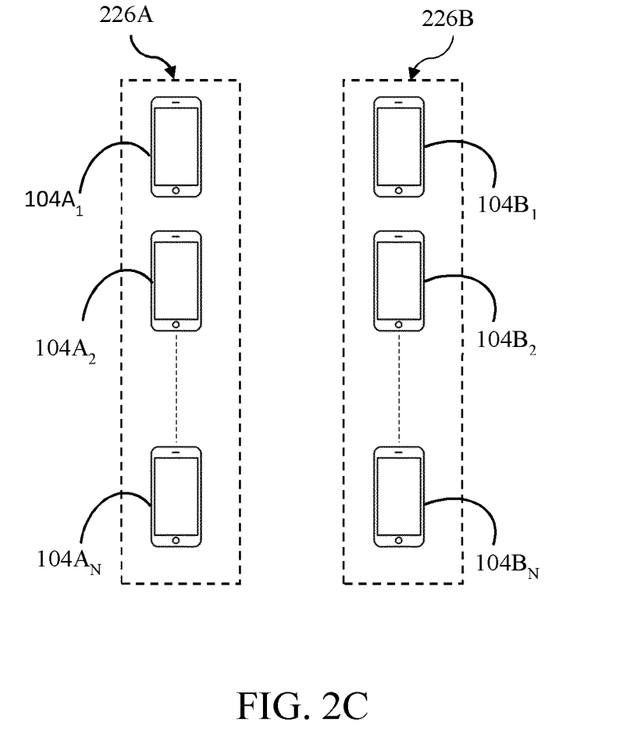
FIG. 2C illustrates a block diagram showing a first group of terminal devices and a second group of terminal devices, according to another example embodiment of the subject matter described herein.
Figure 3A:
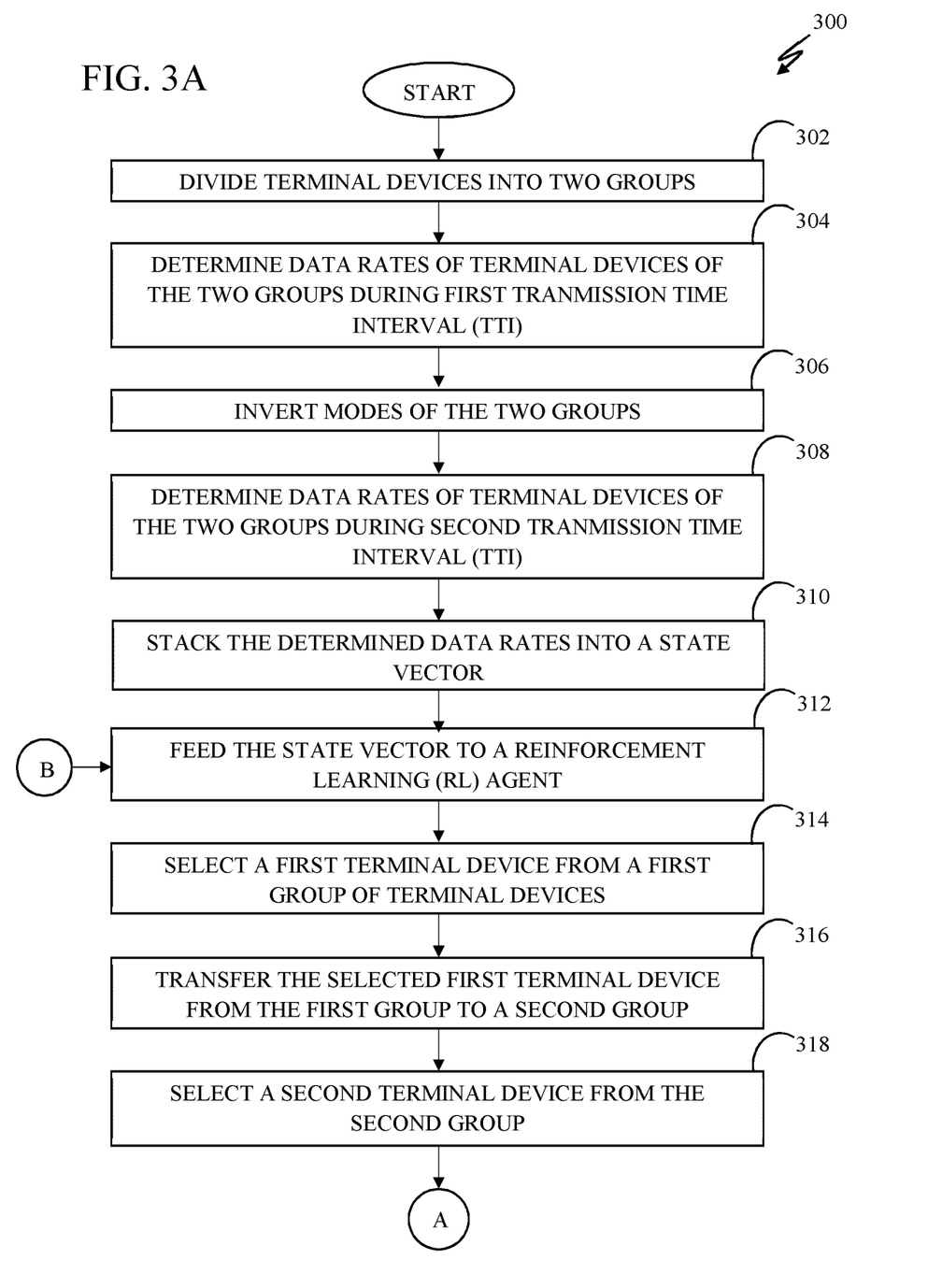
FIGS. 3A and 3B illustrate a flowchart showing a method for selecting a plurality of terminal devices for uplink and downlink transmissions and training the RL agent, according to another example embodiment of the subject matter described herein.
Figure 3B:
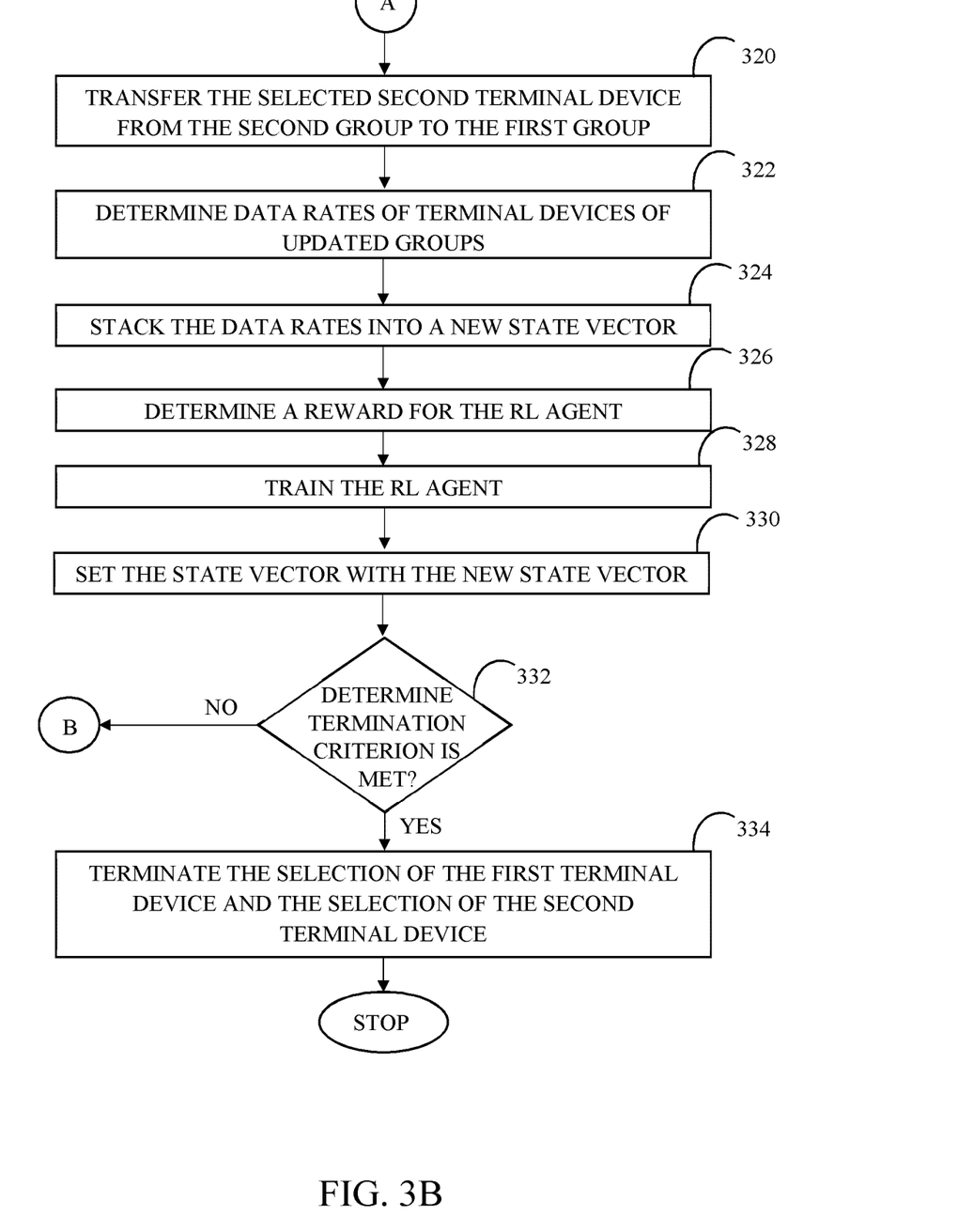

FIG. 2B illustrates the network cell diagram showing the apparatus 102 for selecting the terminal devices 104 for uplink and downlink transmissions, using the RL agent 218, according to an example embodiment. The RL agent 218 may be employed for training the neural network (NN) used in step 208 of the method for selecting the terminal devices for uplink and downlink transmissions of FIG. 2A. In particular, the RL agent 218 is learning the best policy for maximizing a reward 222 for a given state vector 220. Each state may be represented by the state vector 220 comprising data rates of the terminal devices 104 recorded over two TTI with opposing UL and DL allocations. In the given state vector 220, the RL agent 218 may take an action 224, that is, a decision for selecting a terminal device to be transferred from one group of terminal devices to other group of terminal devices. Such action 224 may be followed by a heuristic decision as to which terminal device to transfer to its previous group to maintain the balance between the two groups 226A and 226B.

In one example embodiment, a terminal device selection algorithm is depicted below in pseudo-code and will be described in the following in detail with reference to FIGS. 3A and 3B. The following notation is used: g is a binary indicator vector, which indicates whether given a terminal device is in UL or in DL mode. If g[i]=1, the ith terminal device is in DL, whereas g[i]=0 indicates UL; M denotes the number of terminal devices 104; d(g) is the data rate vector obtained with group division g; $\bar{g}$ denotes the bitwise inversion of g. In this context this means that the UL/DL allocations is inverted for each terminal device.

(1) Measure data rates during two TTIs as $d_1$=d(g) and $d_2$=d($\bar{g}$).
(2) Stack the resulting data rates into the state vector as s=[$d_1$ $d_2$].
(3) Feed s to the neural network (i.e., the RL agent), and obtain the vector of Q-values q, whose length is M+1.
(4) Choose the action as a=argmax(q)∈[0,M].
(5) If a<M, the action is to switch the corresponding UE to the opposite group.
(6) If a=M, the action is to do nothing.
(7) Replace the NN-decided action a with a random choice with probability e.
(8) If a∈[0,M−1], choose another UEb as $b$=argmin($d_1(g=1)$) if $g[a]$=0, or $b$=argmin($d_2(\bar{g}=1)$) if $\bar{g}[a]$=0

(9) Exchange the groups of UEa and b, that is, g[a]←$\overline{g[a]}$ and g[b]←$\overline{g[b]}$.
(10) Using these updated groups, measure data rates during two TTIs as $d_1$=d(g) and $d_2$=d($\bar{g}$).
(11) Stack the resulting data rates into a new state vector as ś=[$d_1$ $d_2$].
(12) Calculate reward r=Σ$d_1$+Σ$d_2$−α(β−min($d_1(g=1)$, $d_2(\bar{g}=1)$))), where α and β are predefined parameters of the reward function.
(13) Feed the new state ś to the NN to obtain the Q-value vector q́ and record the maximum Q-value as $Q_{max}$=max(q́).
(14) Set the Q-target as $q_{target}$[j]=q[j] if j≠a, and $q_{target}$[a]=r+γ$Q_{max}$, where γ is the predefined discount factor.
(15) Train the NN using the old state s as the input and the new Q-value vector $q_{target}$ as the desired output.
(16) Set s=ś.
(17) If termination criteria reached, terminate.
(18) Else, go back to 3.

In the following passages, line numbers refer to the lines of the selection algorithm above. At first, the terminal devices 104 are divided into two groups of terminal devices 104, at step 302 in FIG. 3A. In one example embodiment, the processor 106 may divide the terminal devices 104 into the two groups. This initial division may be done randomly or based on available data rate measurements. One group is operating in downlink (DL) mode while the other group is operating in uplink (UL) mode on the same time-frequency resource. The two groups may correspond to the first group 226A and the second group 226B, as shown in FIG. 2C. The terminal devices 104A of the first group 226A may be scheduled for downlink transmissions and the terminal devices 104B of the second group 226B may be scheduled for uplink transmissions on the same frequency band. Further, the terminal devices 104A of the first group 226A and the terminal devices 104B of the second group 226B may operate at different data rates, while communicating with the base station 102.

Successively, data rates of the terminal devices 104A of the first group 226A and the terminal devices 104B of the second group 226B are determined during a first transmission time interval (TTI), at step 304 in FIG. 3A (line 1). In one example embodiment, the processor 106 may determine the data rates of the terminal devices 104A of the first group 226A and the terminal devices 104B of the second group 226B during the first TTI. During the first TTI, the terminal devices 104A of the first group 226A may be in downlink (DL) mode and the terminal devices 104B of the second group 226B may be in uplink (UL) mode. In one example embodiment, the data rates of the terminal devices 104A of the first group 226A and the terminal devices 104B of the second group 226B, may be stored in the memory 108. Successively, the modes of the first group 226A and the second group 226B are inverted, at step 306 in FIG. 3A. In one example embodiment, the processor 106 may invert the modes of the first group 226A and the second group 226B. For example, the terminal devices 104A of the first group 226A are changed from the DL mode to UL mode. Similarly, the terminal devices 104B of the second group 226B are changed from the UL mode to DL mode.

Successively, data rates of the terminal devices 104A of the first group 226A and the terminal devices 104B of the second group 226B are determined during a second transmission time interval (TTI), at step 308 in FIG. 3A. In one example embodiment, the processor 106 may determine the data rates of the terminal devices 104A of the first group 226A and the terminal devices 104B of the second group 226B during the second TTI. During the second TTI, the terminal devices 104A of the first group 226A may be in UL mode and the terminal devices 104B of the second group 226B may be in DL mode. It should be noted that the first TTI and the second TTI, are two consecutive transmission time intervals. In one example embodiment, the first TTI and the second TTI, may be referred to as an iteration.

In one example embodiment, the data rates during the two TTIs is measured (line 1), as:

$$d_1=d(g) \text{ and } d_2=d(\bar{g})$$

where, g is a binary indicator vector, which indicates whether a terminal device is in UL mode or in DL mode.

In one case, if g[i]=1, the $i^{th}$ terminal device is in DL mode.

In another case, if g[i]=0, the $i^{th}$ terminal device is in UL mode.

$\bar{g}$ denotes the bitwise inversion of g. d(g) is a data rate vector obtained with group division g.

Based at least on the determined data rates of the terminal devices 104A of the first group 226A and the terminal devices 104B of the second group 226B during the first TTI and the second TTI, the processor 106 may stack the determined data rates into a state vector, at step 310 in FIG. 3A (line 2). In one example embodiment, the data rates may be stacked into a state vector (s) such as:

$$s=[d_1 d_2]$$

Successively, the state vector is fed to the RL agent 218, at step 312 in FIG. 3A (line 3). In one example embodiment, the processor 106 may feed the state vector to the RL agent 218. The RL agent 218 may be referred to as a neural network. It should be noted that the neural network uses deep Q-learning to determine an action based at least on the state vector. Further, based at least on the state vector (s), the processor 106 may obtain a vector of quality values i.e. Q-values, (q) whose length is Number of terminal devices (M)+1. Successively, a first terminal device is selected from the first group 226A of terminal devices 104A, at step 314 in FIG. 3A (line 4). In one example embodiment, the processor 106 may select the first terminal device from the first group 226A of terminal devices 104A, using the RL agent 218. Based at least on the selection of the first terminal device, the processor 106 may transfer the selected first terminal device from the first group 226A of terminal devices 104A to the second group 226B of terminal devices 104B, at step 316 in FIG. 3A. In one case (line 5), when a<M, the RL agent 218 performs an action (a) to switch the selected first terminal device from the first group 226A to the second group 226B. The action, a is defined as:

$$a = \mathrm{argmax}(q) \in [0, M]$$

where, M is number of terminal devices 104. It is noted that the action a refers to selecting at least one terminal device or UE "a" (UEa) from the terminal devices of the first group 226A and the second group 226B. In other words, a identifies the UE(s) being selected.

In another case (line 6), when a=M, no action is performed. In one example embodiment, the action a may be replaced with a random action with probability (e) and thus allows the RL agent 218 to try possible combinations of transferring terminal devices 104 from one group to another group. The random action may be uniformly distributed over [0,M].

Successively, a second terminal device is selected from the second group 226B of terminal devices 104B, at step 318 in FIG. 3A. In one example embodiment, the processor 106 may select the second terminal device (which may be denoted as "b", UEb) from the second group 226B of terminal devices 104B based at least on data rates of the terminal devices 104B of the second group 226B, determined during the TTI when the first terminal device was in the group scheduled for the uplink transmission (line 8). It should be noted that the second terminal device is selected from the second group 226B of terminal devices 104B as the terminal device with the determined lowest data rate, using a heuristic function. Such usage of the heuristic function reduces output space of the RL agent 218 and reduces the burden on the RL agent 218 for selecting the second terminal device and thus results in faster learning of the RL agent 218.

Preferable, a selection of the second terminal device (b) is performed when a∈[0,M−1] and defined as (line 8):

$$b = \mathrm{argmin}(d_1(g=1)), \text{ if } g[a]=0, \text{ or}$$

$$b = \mathrm{argmin}(d_2(\overline{g}=1)), \text{ if } \overline{g}[a]=0$$

Successively, the second terminal device is transferred from the second group 226B to the first group 226A, to obtain an updated first group 226A and updated second group 226B, at step 320 in FIG. 3B (line 9). It should be noted that transferring the second terminal device maintains sizes of the first group 226A and the second group 226B and restores balance in the number of terminal devices in the first group 226A and second group 226B, which was earlier disrupted due to transfer of the first terminal device from the first group 226A to the second group 226B. For example, the processor 106 may transfer a terminal device from a group of terminal devices in DL mode to a group of terminal devices in UL mode.

In one example embodiment, the groups UEa and UEb belong to may be exchanged as (line 9):

$$g[a] \leftarrow \overline{g[a]}, \text{ and}$$

$$g[b] \leftarrow \overline{g[b]}$$

to obtain an updated first group 226A and an updated second group 226B.

Successively, data rates of terminal devices of the updated first group 226A and the updated second group 226B are determined, at step 322 in FIG. 3B (line 10). In one example embodiment, the processor 106 may determine the data rates of the terminal devices of the updated first group 226A and the updated second group 226B during a first transmission time interval (TTI) and a second transmission time interval (TTI). In the first TTI, the terminal devices of the updated first group 226A are in downlink (DL) mode and the terminal devices of the updated second group 226B are in uplink (UL) mode. On the other hand, in the second TTI, the terminal devices of the updated first group 226A are in UL mode and the terminal devices of the updated second group 226B are in DL mode. In one example embodiment, the data rates during the two TTIs are defined as:

$$d_1 = d(g) \text{ and } d_2 = d(\overline{g})$$

Thereafter, the data rates of the terminal devices of the updated first group 226A and the updated second group 226B may be stacked into a new state vector defined as $\acute{s}=[d_1 \; d_2]$, at step 324 in FIG. 3B (line 11). Successively, a reward is determined, at step 326 in FIG. 3B (line 12). In one example embodiment, the processor 106 may determine the reward for the RL agent 218 based at least on summation of the determined data rates of the terminal devices of the updated first group 226A and the updated second group 226B reduced by the determined lowest data rate, to penalize for unfairness, with proper scaling. In one example embodiment, the use of the heuristic function may result in maximizing reward for the RL agent 218. In one example embodiment, the reward is determined as:

$$r = \Sigma d_1 + \Sigma d_2 - \alpha(\beta - \min(d_1(g=1), d_2(\overline{g}=1))),$$

where, α and β are predefined parameters of the reward function.

Further, the new state vector, s may be fed to the RL agent 218, to obtain a new Q-value vector, q́ (line 13). Thereafter, the maximum Q-value may be determined and given as:

$$Q_{max} = \max(\acute{q})$$

Successively, the processor 106 may set the target Q-value vector as:

$$q_{target}[j] = q[j], \text{ if } j \neq a.$$

$$q_{target}[a] = r + \gamma Q_{max},$$

where γ is a predefined discount factor (line 14).

Successively, the RL agent 218 is trained, at step 328 in FIG. 3B (line 15). In one example embodiment, the processor 106 may train the RL agent 218 based at least on the determined data rates of the terminal devices of the updated first group 226A, the determined data rates of the terminal devices of the updated second group 226B, and the determined reward. In one example embodiment, the training may be carried out by running a certain number of episodes. For example, an episode includes one round of 20 iterations. In one example embodiment, the RL agent 218 may be trained with the classic supervised learning procedure. In such case, the RL agent 218 may be trained using the state vector, s as an input and the new Q-value vector $q_{target}$ as an output. It should be noted that weights of the RL agent 218 may be updated such that the RL agent 218 provides the output, $q_{target}$ for the corresponding input, state vector, s. It should be noted that such training step may include one forward pass and one backpropagation step during 2 TTIs. The backpropagation step may be used for updating the weights. In one example, Adam optimization algorithm is used for updating the weights. It should be noted that the RL agent 218 may be trained during offline mode and thus may result in improving the efficiency of the algorithm. Based on the training of the RL agent 218, the RL agent 218 learns to detect the interference structure based at least on the data rates of the terminal devices 104. It should be noted that the training of the RL agent 218 for selection of the terminal device results in minimizing the interference between the two groups of terminal devices 104, operating on the same frequency.

Successively, the processor 106 may set the state vector (s) with the new state vector, s i.e. s=ś, for the next iteration of the algorithm, at step 330 in FIG. 3B (line 16). Further, the RL agent 218 may be trained for selecting the first terminal device such that it minimizes the interference between two groups i.e. the first group 226A and the second group 226B, operating on the same frequency. Successively, the processor 106 may determine whether a termination criterion is met, at step 332 in FIG. 3B (line 17). The termination criterion may include, but are not limited to, completing a predefined number of phases for the selection of the terminal device, attaining a predetermined sum rate, attaining a predetermined minimum downlink data rate, or the first group 226A and the second group 226B having not changed during a predefined number of phases.

In one case, if the termination criterion is met, then the processor 106 may terminate the selection of the first terminal device and the selection of the second terminal device, at step 334 in FIG. 3B (line 17). As discussed above, the termination may be performed based at least on the termination criterion. In another case, if the termination criterion is not met, then the processor 106 may execute a further iteration of the above illustrated process from step 312 to step 332 in FIGS. 3A and 3B (line 18).

It should be noted that the above-mentioned data rates of the terminal devices 104A of the first group 226A and the data rates of the terminal devices 104B of the second group 226B, and the data rates of the terminal devices of the updated first group 226A and the updated second group 226B are normalized between 0 and 1.

In one example embodiment, the above algorithm is trained and simulated with a basic system simulator implemented in TensorFlow using one or more simulation parameters listed in Table 1. The one or more simulation parameters includes, but are not limited to, a number of terminal devices 104, beamforming gain at the base station 102, receiver noise floor, target downlink received power, target uplink received power, and number of iterations. In TensorFlow, a single cell serving multiple uplink and downlink terminal devices 104 by means of multi-user multiple-input multiple-output, MU-MIMO is considered. Further, the terminal devices 104 are operating on same frequency band. It should be noted that results of the algorithm also apply to a case when the terminal devices 104 are multiplexed onto different resource blocks, where the interference includes uplink transmissions of only one terminal device.

TABLE 1

| PARAMETER | VALUE |
| --- | --- |
| NUMBER OF TERMINAL DEVICES | 12 |
| BEAMFORMING GAIN AT BASE STATION | 10 dB |
| RECEIVER NOISE FLOOR | −90 dBm |
| TARGET DOWNLINK RECEIVED POWER | −75 dBm |
| TARGET UPLINK RECEIVED POWER | −85 dBm |
| NUMBER OF ITERATIONS | 20 |

As shown in Table 1, during the simulation, the base station 102 is serving 12 terminal devices 104. Out of total 12 terminal devices 104, 6 terminal devices 104A are in DL mode and other 6 terminal devices 104B are in UL mode in a given TTI. Further, the base station 102 separates the terminal devices 104 into beams, with a beamforming gain of 10 dB (decibel), for facilitating MU-MIMO. Further, power control is assumed to be ideal, meaning that a transmit power is selected such that target reception power is always reached. Further, the algorithm is allowed to run for 20 iterations to improve terminal device group division. It should be noted that one iteration includes 2 TTIs, such that the first group 226A of the terminal devices 104A serves both in UL mode and in DL mode. Further, the action is performed for the state vector, using the RL agent 218. Further, the terminal devices 104 are adjusted accordingly before the next iteration. Thereafter, the RL agent 218 is updated during the iteration.

Figure 4:
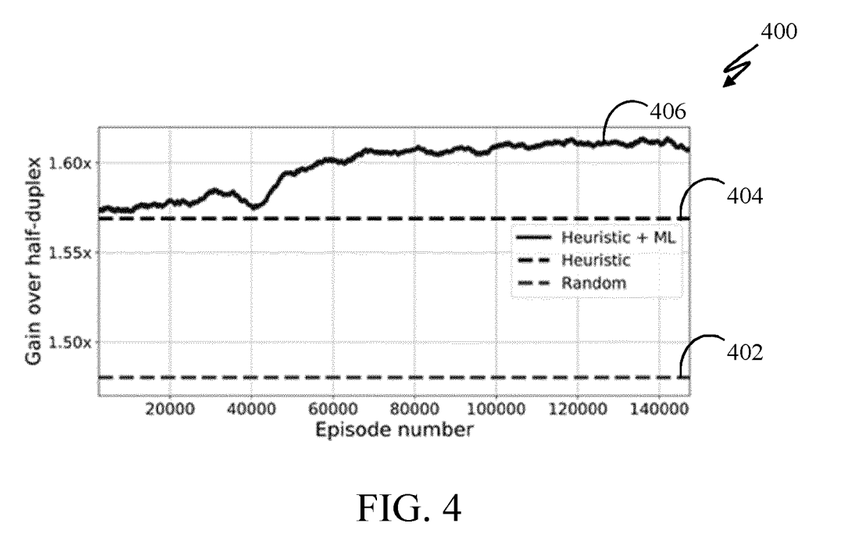
FIG. 4 illustrates a graph showing a comparison of a random approach, a heuristic approach, and a combination of heuristic and reinforcement learning, RL approach in terms of gain, according to another example embodiment of the subject matter described herein.

FIG. 4 illustrates a graph 400 showing a comparison of a random approach (shown by 402), a heuristic approach (shown by 404), and a combination of heuristic and reinforcement learning, RL i.e. machine learning, ML approach (shown by 406) in terms of gain, according to one example embodiment. The graph 400 shows the gain in the average data rate with respect to number of episodes. In one case, an episode includes one round of 20 iterations for fixed terminal device positions, such that episodes start with new random terminal device positions. In the random approach (shown by 402), the uplink and downlink terminal devices are selected randomly, and hence the uplink-to-downlink interference is not managed. Further, the performance of fully random terminal device allocation is poorest with a gain of around 48%. In the heuristic approach (shown by 404), a random selection of a terminal device is first performed. The random selected terminal device is then moved to other group and replaced by the terminal device having the lowest downlink data rate while the selected terminal device was in uplink, UL mode.

As shown in FIG. 4, the heuristic approach (shown by 404) provides better gain as compared to the random approach (shown by 402). On the other hand, when the combination of heuristic and RL approach (shown by 406) is used, then gain of over 60% is obtained. Further, during the first episodes, the performance of the combination of heuristic and RL approach (shown by 406) is same as heuristic approach. After 70000 episodes, the capacity gain is increased upto 60%. It should be noted that the combination of heuristic and RL approach (shown by 406) achieves an average 92% of optimal data rate, which is obtained by searching through the different uplink and downlink allocations. Such combination of heuristic and RL approach (shown by 406) requires 20 iterations as compared to brute-force search that requires 924 iterations. It should be noted that such approaches are compared to a corresponding half-duplex system, which operates under a constraint that transmitters and receivers cannot operate simultaneously i.e. it serves the downlink terminal devices in the first TTI and the uplink terminal devices in a different TTI. Alternatively, the uplink and downlink may be divided into different frequency bands, which results in the same spectral efficiency as the time-division approach.

Figure 5:
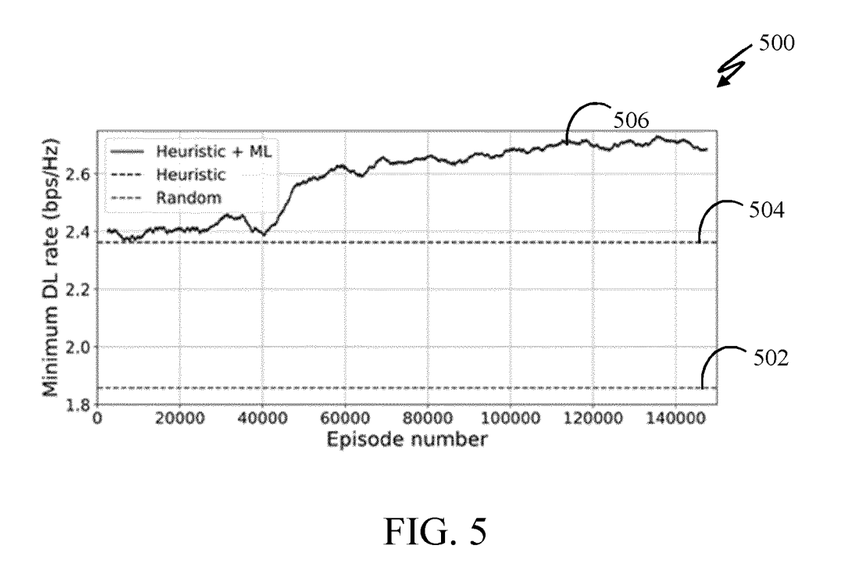
FIG. 5 illustrates a graph showing a comparison of a random approach, a heuristic approach, and a combination of heuristic and reinforcement learning, RL approach in terms of minimum downlink data rate, according to another example embodiment of the subject matter described herein.

FIG. 5 illustrates a graph 500 showing a comparison of a random approach (shown by 502), a heuristic approach (shown by 504), and a combination of heuristic and reinforcement learning, RL i.e. machine learning approach (shown by 506) in terms of minimum downlink data rate, according to one example embodiment. The graph 500 shows the minimum downlink data rate that is observed with respect to the number of episodes. The combination of heuristic and RL approach (shown by 506) improves the minimum downlink data rate as compared to the random approach (shown by 502) and the heuristic approach (shown by 504). The improvement is due to the reward function, which penalizes for low minimum data rates. The improvement of the minimum downlink data rate is around 45% over random uplink-downlink division. Thus, the graph 400 and the graph 500 show that the algorithm provides performance gain without requiring additional signaling or overhead and the capacity improvement over a corresponding half-duplex network is 610%, which is 92% of the highest achievable sum-rate.

It will be apparent to one skilled in the art that the above-mentioned algorithm for selecting the terminal devices 104 for uplink and downlink transmissions, may be applicable to static terminal devices 104. In one alternate embodiment, the algorithm may be applicable when the terminal devices 104 are moving. In this case, the mobility of the terminal devices 104 may be taken into account either during initiation of the above algorithm or by continuous tracking of the terminal devices 104. Further, the continuous tracking of the terminal devices 104, ensures high data rate, as the algorithm reacts to data rates of a mobile terminal device in order of milliseconds. Further, the near-optimal terminal devices groups may be identified in 40 TTIs or less (i.e. at most 40 ms) with the help of the algorithm.

It should be noted that the terminal devices 104 move very short distances during such a short time period, and thus the network appears almost static. In such cases, the algorithm maintains optimal terminal device division, and maintains better terminal device division when run continuously to track the situation. Further, measurement of the data rates may not require any extra transmissions since the base station 102 i.e. gNB tracks the signal quality of the different terminal devices 104 (e.g., for link adaptation). In one example embodiment, such algorithm may be useful for beam allocation in 5G systems, without departing from the scope of the disclosure.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

The detailed description section of the application should state that orders of method steps are not critical. Such recitations would later support arguments that the step order in a method claim is not critical or fixed. Features that are described and/or illustrated with respect to one embodiment may be used in the same way or in a similar way in one or more other embodiments and/or in combination with or instead of the features of the other embodiments.

While the above embodiments have been illustrated and described, as noted above, many changes can be made without departing from the spirit and scope of the example embodiments. For example, aspects of the subject matter disclosed herein may be adopted on alternative operating systems. Accordingly, the scope of the example embodiments is not limited by the disclosure of the embodiment. Instead, the example embodiments should be determined entirely by reference to the claims that follow.

What is claimed is:

1. An apparatus for selecting a plurality of terminal devices for uplink and downlink transmissions, the apparatus comprising:
at least one processor; and
at least one memory including computer program code,
the at least one memory and the computer program code configured to, with the at least one processor, cause the apparatus to perform:
selecting a first terminal device from a first group of terminal devices; and
transferring the selected first terminal device from the first group of terminal devices to a second group of terminal devices,
wherein one group of terminal devices is scheduled for uplink transmission and the other group of terminal devices is scheduled for downlink transmission;
wherein the selecting a first terminal device comprises a reinforcement learning agent for selecting the first terminal device based at least on data rates of the terminal devices of the first group and data rates of the terminal devices of the second group.

2. The apparatus of claim 1, where the at least one memory and the computer program code are configured to, with the at least one processor, cause the apparatus to perform:
determining the data rates of the terminal devices of the first group and the data rates of the terminal devices of the second group during a first transmission time interval when the terminal devices of the first group are in downlink mode and the terminal devices of the second group are in uplink mode, and during a second transmission time interval when the terminal devices of the first group are in uplink mode and the terminal devices of the second group are in downlink mode.

3. The apparatus of claim 2, wherein the first transmission time interval and the second transmission time interval are two consecutive transmission time intervals.

4. The apparatus of claim 3, where the at least one memory and the computer program code are configured to, with the at least one processor, cause the apparatus to perform:
selecting a second terminal device from the second group of terminal devices based on data rates of the terminal devices of the second group, determined during the two consecutive transmission time intervals when the first terminal device was in the group scheduled for the uplink transmission; and
transferring the selected second terminal device from the second group of terminal devices to the first group of terminal devices, to obtain an updated first group of terminal devices and an updated second group of terminal devices.

5. The apparatus of claim 4, wherein the second terminal device is selected from the second group of terminal devices as the terminal device with a determined lowest data rate.

6. The apparatus of claim 4, wherein data rates of terminal devices of the updated first group and the updated second group are determined.

7. The apparatus of claim 4, where the at least one memory and the computer program code are configured to, with the at least one processor, cause the apparatus to perform:
determining a reward for the reinforcement learning agent based at least on summation of the determined data rates of the terminal devices of the updated first group and the updated second group reduced by the determined lowest data rate.

8. The apparatus of claim 4, where the at least one memory and the computer program code are configured to, with the at least one processor, cause the apparatus to perform:
training the reinforcement learning agent based at least on the determined data rates of the terminal devices of the updated first group and the updated second group and the determined reward.

9. The apparatus of claim 4, wherein the data rates of the terminal devices of the first group and the terminal devices of the second group, and the data rates of the terminal devices of the updated first group and the updated second group are normalized between 0 and 1.

10. The apparatus of claim 4, where the at least one memory and the computer program code are configured to, with the at least one processor, cause the apparatus to perform:
terminating the selection of the first terminal device and the selection of the second terminal device based at least on completing a predefined number of phases for the selection of the terminal device, attaining a predetermined sum rate, attaining a predetermined minimum downlink data rate, or the first group and the second group have not changed during a predefined number of phases.

11. A method for selecting a plurality of terminal devices for uplink and downlink transmissions, comprising:
selecting a first terminal device from a first group of terminal devices; and
transferring the selected first terminal device from the first group of terminal devices to a second group of terminal devices;
wherein one group of terminal devices is scheduled for uplink transmission and the other group of terminal devices is scheduled for downlink transmission;
wherein the first terminal device is selected based at least on data rates of the terminal devices of the first group and data rates of the terminal devices of the second group using a reinforcement learning agent.

12. The method of claim 11, further comprising:
determining the data rates of the terminal devices of the first group and the data rates of the terminal devices of the second group during a first transmission time interval, transmission time interval when the terminal devices of the first group are in downlink mode and the terminal devices of the second group are in uplink mode, and during a second transmission time interval when the terminal devices of the first group are in uplink mode and the terminal devices of the second group are in downlink mode.

13. The method of claim 12, further comprising:
selecting a second terminal device from the second group of terminal devices based on data rates of the terminal devices of the second group, determined during the first transmission time interval when the first terminal device was in the group scheduled for the uplink transmission; and
transferring the selected second terminal device from the second group of terminal devices to the first group of terminal devices, to obtain an updated first group of terminal devices and an updated second group of terminal devices.

14. The method of claim 13, wherein the second terminal device is selected from the second group of terminal devices as the terminal device with the determined lowest data rate.

15. A non-transitory computer-readable medium including instructions for causing a processor to perform functions including:
selecting a first terminal device from a first group of terminal devices; and
transferring the selected first terminal device from the first group of terminal devices to a second group of terminal devices;
wherein one group of terminal devices is scheduled for uplink transmission and the other group of terminal devices is scheduled for downlink transmission;
wherein the first terminal device is selected based at least on data rates of the terminal devices of the first group and data rates of the terminal devices of the second group using a reinforcement learning agent.

* * * * *